United States Patent
Umeuchi et al.

(10) Patent No.: US 9,469,714 B2
(45) Date of Patent: Oct. 18, 2016

(54) CATIONIC EMULSION HAVING POLYMER CORE-SHELL STRUCTURE, AQUEOUS INK, AND RECORDING MEDIUM

(71) Applicants: SEIKO PMC CORPORATION, Tokyo (JP); NISSIN CHEMICAL INDUSTRY CO., LTD., Echizen-shi, Fukui (JP)

(72) Inventors: Shiro Umeuchi, Ichihara (JP); Kenji Nasu, Akashi (JP); Yasuhiro Mitta, Echizen (JP)

(73) Assignees: SEIKO PMC CORPORATION, Tokyo (JP); NISSIN CHEMICAL INDUSTRY CO., LTD., Echizen-shi (JP)

( * ) Notice: Subject to any disclaimer, the term of this patent is extended or adjusted under 35 U.S.C. 154(b) by 0 days.

(21) Appl. No.: 14/760,666

(22) PCT Filed: Feb. 4, 2014

(86) PCT No.: PCT/JP2014/052533
§ 371 (c)(1),
(2) Date: Jul. 13, 2015

(87) PCT Pub. No.: WO2014/123109
PCT Pub. Date: Aug. 14, 2014

(65) Prior Publication Data
US 2015/0353670 A1 Dec. 10, 2015

(30) Foreign Application Priority Data
Feb. 7, 2013 (JP) ................. 2013-022553

(51) Int. Cl.
| | | |
|---|---|---|
| C08F 257/02 | (2006.01) | |
| B41M 5/52 | (2006.01) | |
| C09D 11/107 | (2014.01) | |
| C08F 2/28 | (2006.01) | |
| C08F 265/04 | (2006.01) | |
| C09D 151/00 | (2006.01) | |
| C09D 11/023 | (2014.01) | |
| C09D 11/106 | (2014.01) | |
| C09D 11/30 | (2014.01) | |

(52) U.S. Cl.
CPC ............ *C08F 257/02* (2013.01); *B41M 5/52* (2013.01); *B41M 5/5254* (2013.01); *C08F 2/28* (2013.01); *C08F 265/04* (2013.01); *C09D 11/023* (2013.01); *C09D 11/106* (2013.01); *C09D 11/107* (2013.01); *C09D 11/30* (2013.01); *C09D 151/003* (2013.01); *B41M 5/5245* (2013.01)

(58) Field of Classification Search
CPC ..... C08F 257/02; B41M 5/52; B41M 5/5245; B41M 5/5254; C09D 11/107
USPC ........................................... 524/535
See application file for complete search history.

(56) References Cited

U.S. PATENT DOCUMENTS

| | | |
|---|---|---|
| 4,200,562 A | 4/1980 | Yoshioka et al. |
| 4,235,982 A | 11/1980 | Maslanka et al. |
| 4,279,653 A | 7/1981 | Makishima et al. |
| 4,429,070 A | 1/1984 | Gioeni et al. |
| 5,147,926 A | 9/1992 | Meichsner et al. |

(Continued)

FOREIGN PATENT DOCUMENTS

| | | | |
|---|---|---|---|
| EP | 0 072 684 A1 | 2/1983 | |
| EP | 0250629 A1 * | 1/1988 | .......... C09J 133/062 |

(Continued)

OTHER PUBLICATIONS

International Search Report, issued in PCT/JP2014/052533, dated May 13, 2014.

(Continued)

*Primary Examiner* — Ling Choi
*Assistant Examiner* — Ronald Grinsted
(74) *Attorney, Agent, or Firm* — Birch, Stewart, Kolasch & Birch, LLP

(57) ABSTRACT

The invention provides a cationic emulsion having a polymer core-shell structure that exhibits excellent substrate adhesiveness, water resistance, alcohol resistance, and high gloss when used in an aqueous ink, and exhibits excellent color developing properties and water resistance when used in a recording medium, specifically, a cationic emulsion having a polymer core-shell structure comprising component (A) and component (B) and having a mass ratio of component (A):component (B) of 25:75-75:25.

(A) Emulsion polymer core component obtained by polymerizing a monomer having a vinyl chloride monomer as a constituent.

(B) Emulsion polymer shell component, having a structure obtained by polymerizing a monomer mixture having, as constituents: styrenes and a compound of formula (1); or styrenes, a compound of formula (1), and a (meth)acrylic ester having 1-22 carbon atoms in the ester part as a compound (2); in which the compound of formula (1) is 20-45 mass % in the monomer mixture.

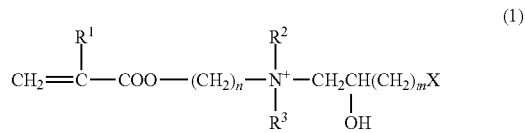

(1)

8 Claims, No Drawings

(56) References Cited

U.S. PATENT DOCUMENTS

| | | |
|---|---|---|
| 5,913,971 A | 6/1999 | Fujimatsu et al. |
| 6,034,183 A | 3/2000 | Okumura et al. |
| 7,754,297 B2 | 7/2010 | Tsujihata et al. |
| 8,691,888 B2 | 4/2014 | Mitta et al. |
| 2002/0127376 A1 | 9/2002 | Hutter et al. |
| 2003/0112311 A1 | 6/2003 | Naik et al. |
| 2003/0215604 A1* | 11/2003 | Samaranayake ..... B41M 5/5218 428/138 |
| 2013/0331504 A1 | 12/2013 | Mitta et al. |

FOREIGN PATENT DOCUMENTS

| | | |
|---|---|---|
| JP | 53-61412 A | 6/1978 |
| JP | 54-6902 A | 1/1979 |
| JP | 54-89811 A | 7/1979 |
| JP | 55-51583 A | 4/1980 |
| JP | 55-65269 A | 5/1980 |
| JP | 56-99214 A | 8/1981 |
| JP | 56-148584 A | 11/1981 |
| JP | 58-74769 A | 5/1983 |
| JP | 58-111853 A | 7/1983 |
| JP | 61-235478 A | 10/1986 |
| JP | 2-238015 A | 9/1990 |
| JP | 8-113751 A | 5/1996 |
| JP | 8-253716 A | 10/1996 |
| JP | 9-12956 A | 1/1997 |
| JP | 10-176132 A | 6/1998 |
| JP | 11-60614 A | 3/1999 |
| JP | 2002-348305 A | 12/2002 |
| JP | 2004-167784 A | 6/2004 |
| JP | 2004-538187 A | 12/2004 |
| JP | 2005-529998 A | 10/2005 |
| WO | WO 2010/140647 A1 | 12/2010 |
| WO | WO 2012/128138 A1 | 9/2012 |

OTHER PUBLICATIONS

Written Opinion of the International Searching Authority, issued in PCT/JP2014/052533, dated May 13, 2014.

* cited by examiner

CATIONIC EMULSION HAVING POLYMER CORE-SHELL STRUCTURE, AQUEOUS INK, AND RECORDING MEDIUM

TECHNICAL FIELD

This invention relates to a cationic emulsion comprising a core-shell structure polymer, which can be advantageously utilized in ink, paint, receiving layer of recording medium, textile treating agent, and the like. More particularly, it relates to a cationic emulsion comprising a core-shell structure polymer, which exhibits excellent substrate adhesion, water resistance, humidity resistance, alcohol resistance and high gloss when used in aqueous ink, and exhibits excellent color development and water resistance and is suitable as a coating agent for recording media when used in recording media. It also relates to an aqueous ink composition and recording medium comprising the emulsion.

BACKGROUND ART

Reference is first made to gravure printing ink. In general printing, the quality of printing depends on the printability and printing effect of printing ink. The printability is a set of properties associated with the behavior of ink from transfer of ink on a printing machine to an object to be printed to completion of a printed surface, the properties mainly including fluidity, interfacial compatibility and drying of ink. On the other hand, the printing effect is the finish of printing that the ink having formed a printed surface develops, evaluated in terms of such properties as color tone, gloss, water resistance, and blocking resistance. Ink is basically composed of a coloring matter (dye or pigment), vehicle, and auxiliary agents (flow adjusting agents, drying adjusting agents, etc.). Of these, the vehicle has the most impact on the printability and printing effect. The vehicle is basically composed of a binder, wax, solvent and the like. By a choice of the binder, the nature of the vehicle is substantially changed, on which the printability and printing effect largely depend.

The binders are generally classified into solvent binders and aqueous binders. The solvent binders include urethane resins as proposed in JP-A H09-12956 (Patent Document 1). Nowadays, however, the considerations of air pollution, fire risk and working hygiene turn attention to the aqueous binders not using organic solvents.

The aqueous binders are generally divided into alkali soluble resins as typified by styrene-acrylic resins, water-soluble resins as typified by polyvinyl alcohol, and water-dispersed resins as typified by urethane emulsions (Patent Document 2: JP-A H02-238015) and acrylic emulsions.

In general, in the case of printing using an aqueous ink comprising a water-dispersed resin as the binder, the ink is applied from a printer onto an area to be printed at room temperature, and thereafter dried at or above the glass transition temperature of the water-dispersed resin until finished. When heated at or above the glass transition temperature, overall resin particles fuse together to form a uniform film which develops and improves water resistance. With an attention paid to drying on the printer among printability factors, the printing ink must maintain fluidity on the printer for a time as long as possible without drying. In this regard, the solvent type resin, alkali-soluble resin and water-soluble resin are non-problematic in that even if the resin once becomes a dry film, the resin resumes original fluidity when dissolved in solvent, alkaline aqueous solution or water, whereas the water-dispersed resin is problematic in that once the resin is dry so that resin particles fuse together at their surface, the resin does not resume fluidity even when contacted with water, leading to a failure of printing. On the other hand, the alkali-soluble resin suffers from poor alkali resistance and the water-soluble resin suffers from poor water resistance. Then conventional binders are often prepared by combining the alkali-soluble resin, or water-soluble resin with the water-dispersed resin. In the state-of-the-art, an attempt to improve printability encounters a loss of alkali or water resistance while an attempt to improve alkali or water resistance leads to insufficient printability.

To solve the problem, JP-A H10-176132 (Patent Document 3) proposes a binder for aqueous ink comprising a monomer selected from vinyl chloride, an alkyl (meth)acrylate having an alkyl moiety of 1 to 18 carbon atoms, and a monoalkenylbenzene, an ethylenically unsaturated monomer having a functional group, and another ethylenically unsaturated monomer. However, problems remain with respect to humidity resistance and gloss.

Reference is now made to inkjet ink. The inkjet recording system is excellent in quiet, recording speed, setting quality and running cost, and is generally on widespread use. As the ink for use in this system, an aqueous ink is selected from the aspects of ink physical properties, safety, and ease of handling, ink compositions having a water-soluble dye such as an acidic dye, direct dye or basic dye, dissolved in a glycol solvent and water are known from Patent Documents 4 to 6: JP-A S53-61412, JP-A S54-89811, and JP-A S55-65269. They have the drawback of poor water resistance.

Thus the use of pigments as the coloring component is under investigation. Acrylic resins or styrene-acrylic resins having carboxyl groups incorporated therein (Patent Document 7: JP-A S61-235478) and aqueous resins in the form of ternary copolymers of acrylic acid, styrene and α-methylstyrene (Patent Document 8: JP-A H08-253716) are used to disperse pigments. Although improvements in water resistance and weather resistance are noticeable, there is left a room for improvement in dispersion (change with time) of pigments.

Next, reference is made to the receiving layer of recording media, especially of inkjet recording media. Currently the recording system using aqueous ink is frequently employed in the printer in the business machine system including personal computers, and accordingly the demand for recording material suited for that system is increasing. Meanwhile, a recording material having better characteristics is required in order to achieve further improvements in quality, colorfulness, appearance and definition of printed images. The recording material is used in diversified applications while requirements of properties such as water resistance and color development become increasingly stricter. As a typical receiving layer, there are proposed a recording sheet in which amorphous silica and a polymeric binder such as polyvinyl alcohol are combined and coated on a base paper (Patent Document 9: JP-A S55-51583) and a recording sheet comprising a base paper provided on front and back surfaces with an ink receiving layer containing porous pigment particles (Patent Document 10: JP-A S56-148584). Although a significant improvement in colorfulness or sharpness is achieved as compared with conventional recording sheets using wood-free paper, these receiving layers have the problems that a reduced coating weight allows for irregular spread of ink, resulting in printed images with substantial bleeding and that with an increased coating weight, bleeding is reduced, but the coating layer tends to spell off, causing dusting. Also, when polymeric binders such as polyvinyl alcohol are used, the viscosity of coating solution is extremely high, giving rise to the problem of poor coating viability, and the concentration of coating solution cannot be set high, giving rise to the cost problem that the water drying load is increased.

Also proposed in Patent Document 11: WO 2010/140647 is a vinyl chloride base resin emulsion obtained from emulsion-polymerization of 100 parts by weight of a monomeric composition containing a vinyl chloride monomer or a vinyl chloride monomer and an ethylenically unsaturated monomer copolymerizable therewith, in the presence of 40 to 500 parts by weight of a styrene-acrylate oligomer and/or acrylate oligomer having a number average molecular weight of 5,000 to 50,000. When this emulsion is used as aqueous ink binder or in recoding media, relatively good water resistance, color development, and alcohol resistance are exerted, but surface coating strength effect is still insufficient. Further, Patent Document 12: JP-A 2004-167784 proposes an inkjet recording sheet having a colorant-receiving layer on a support, wherein the colorant-receiving layer comprises fine particles, a water-soluble resin and a specific cationic resin, but its surface coating strength is insufficient.

CITATION LIST

Patent Documents

Patent Document 1: JP-A H09-12956
Patent Document 2: JP-A H02-238015
Patent Document 3: JP-A H10-176132
Patent Document 4: JP-A S53-61412
Patent Document 5: JP-A S54-89811
Patent Document 6: JP-A S55-65269
Patent Document 7: JP-A S61-235478
Patent Document 8: JP-A H08-253716
Patent Document 9: JP-A S55-51583
Patent Document 10: JP-A S56-148584
Patent Document 11: WO 2010/140647
Patent Document 12: JP-A 2004-167784

SUMMARY OF INVENTION

Technical Problem

An object of the invention, which has been made under the above-mentioned circumstances, is to provide a cationic emulsion comprising a core-shell structure polymer which exhibits excellent substrate adhesion, water resistance, humidity resistance, alcohol resistance, and high gloss when used in aqueous ink, and exhibits excellent color development and water resistance and is suitable as a coating agent for recording media when used in recording media; an aqueous ink composition; and a recording medium.

Solution to Problem

Making extensive investigations to attain the above object, the inventors have found that the outstanding problems can be overcome by a cationic emulsion comprising a core-shell structure polymer comprising a polymer core component composed mainly of vinyl chloride resin and a polymer shell component containing a polymer of a cationic monomer of specific structure, in a ratio of core component to shell component between 25/75 and 75/25. The present invention is predicated on this finding.

Accordingly, the invention provides a cationic emulsion, an aqueous ink composition, and a recording medium as defined below.

[1] A cationic emulsion comprising a core-shell structure polymer consisting of components (A) and (B) in a weight ratio (A)/(B) of 25/75 to 75/25,
(A) a core component of the emulsion polymer obtained by polymerising a monomer comprising a vinyl chloride monomer as a constituent,
(B) a shell component of the emulsion polymer having a structure obtained by polymerizing a monomer mixture comprising a styrene and a compound of the general formula (1), or a styrene, a compound of formula (1), and a compound (2) which is a (meth)acrylate having 1 to 22 carbon atoms in its ester moiety as constituents wherein the compound of formula (1) is 20 to 45% by weight of the monomer mixture,
the general formula (1);

[Chemical Formula 1]

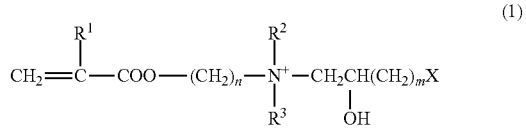

wherein $R^1$ is hydrogen or methyl, $R^2$ and $R^3$ are each independently alkyl, n and m are each independently an integer of at least 1, and X is halogen, methyl or hydrogen.
[2] The cationic emulsion of [1] wherein, in the polymer core component (A), the monomer consists of 80 to 100% by weight of vinyl chloride monomer and 0 to 20% by weight of a monomer copolymerizable therewith.
[3] The cationic emulsion of [1] or [2] wherein in the polymer shell component (B), the monomer mixture consists of 30 to 80% by weight of the styrene, 20 to 45% by weight of the compound of formula (1), 0 to 25% by weight of the compound (2), and 0 to 5% by weight of a monomer copolymerizable with the styrene and the compound of formula (1).
[4] An aqueous ink composition comprising the cationic emulsion of any one of [1] to [3].
[5] The aqueous ink composition of [4] wherein the cationic emulsion is present in a content of 2 to 30% by weight calculated as solids, said ink composition further comprising 0 to 40% by weight of a colorant, 0 to 60% by weight of a water-soluble organic solvent, and 5 to 95% by weight of water.
[6] A recording medium comprising a coating of the cationic emulsion of any one of [1] to [3].
[7] A recording medium comprising a coating of a composition comprising 0.1 to 10% by weight as solids of the cationic emulsion of any one of [1] to [3], 0 to 20% by weight of a pigment, 0.1 to 20% by weight of a binder, and the balance of water or water and a water-soluble organic solvent.
[8] The recording medium of [6] or [7] wherein the coating forms a receiving layer.

Advantageous Effects of Invention

The cationic emulsion of the invention exhibits excellent substrate adhesion, water resistance, humidity resistance, alcohol resistance, and high gloss when used in aqueous ink, and exhibits excellent color development and water resistance and is suitable as a coating agent for recording media when used in recording media. The emulsion may be advantageously utilized as a binder for ink, paint, inorganic dispersion or the like, a receiving layer for recording sheets, a textile treating agent and the like.

DESCRIPTION OF EMBODIMENTS

The invention provides a cationic emulsion (or vinyl chloride base resin emulsion) comprising a core-shell structure polymer consisting of components (A) and (B) in a weight ratio (A)/(B) of 25/75 to 75/25, (A) a core component of the emulsion polymer obtained by polymerising a monomer comprising vinyl chloride as a constituent, (B) a shell component of the emulsion polymer having a structure obtained by polymerizing a monomer mixture comprising a styrene and a compound of the general formula (1), or a styrene, a compound of formula (1), and a compound (2) which is a (meth)acrylate having 1 to 22 carbon atoms in its ester moiety as constituents wherein the compound of formula (1) is 20 to 45% by weight of the monomer mixture, the general formula (1);

[Chemical Formula 2]

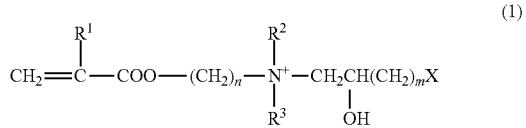

(1)

wherein $R^1$ is hydrogen or methyl, $R^2$ and $R^3$ are each independently alkyl, n and m are each independently an integer of at least 1, and X is halogen, methyl or hydrogen, The polymer core component (A) in the cat ionic emulsion comprising a core-shell structure polymer is described below.

The monomer from which component (A) is derived is composed of 80 to 100% by weight of vinyl chloride monomer and 0 to 20% by weight of a monomer copolymerizable therewith.

Examples of the monomer copolymerizable with vinyl chloride include vinyl acetate, ethylene, propylene, and vinylidene chloride, as well as vinyl carboxylate monomers such as vinyl propionate; aromatic vinyl monomers such as styrene and α-methylstyrene; conjugated diene monomers such as 1,3-butadiene and 2-methyl-1,3-butadiene; ethylenically unsaturated monocarboxylic acid esters such as methyl acrylate, ethyl acrylate, butyl acrylate, 2-ethylhexyl acrylate, and methyl methacrylate; ethylenically unsaturated polycarboxylic acid esters such as dimethyl itaconate, diethyl maleate, monobutyl maleate, monoethyl fumarate, and dibutyl fumarate; ethylenically unsaturated monocarboxylic acids such as acrylic acid, methacrylic acid, and crotonic acid; ethylenically unsaturated dicarboxylic acids such as itaconic acid, maleic acid and fumaric acid; epoxy-containing monomers such as glycidyl methacrylate; alcoholic hydroxyl-containing monomers such as 2-hydroxyethyl methacrylate; alkoxyl-containing monomers such as methoxyethyl acrylate; nitrile-containing monomers such as acrylonitrile; amide-containing monomers such as acrylamide; amino-containing monomers such as dimethylaminoethyl methacrylate; and monomers having at least two ethylenically unsaturated groups in the molecule, such as divinyl benzene and allyl methacrylate. One or more may be selected from the foregoing examples. Inter alia, vinyl acetate, ethylenically unsaturated monocarboxylic acid esters, and ethylenically unsaturated monocarboxylic acids are preferred.

Next, the polymer shell component (B) in the cationic emulsion comprising a core-shell structure polymer is described below.

The polymer shell component may have a structure obtained by polymerising a styrene and a compound of the general formula (1) as monomer units, and optionally further polymerising an alkyl (meth)acrylate or the like, the general formula (1):

[Chemical Formula 3]

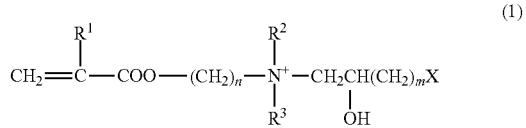

(1)

wherein $R^1$ is hydrogen or methyl, $R^2$ and $R^3$ are each independently alkyl, n and m are each independently an integer of at least 1, and X is halogen, methyl or hydrogen, In formula (1), $R^2$ and $R^3$ are alkyl groups, preferably straight, branched or cyclic alkyl groups of 1 to 10 carbon atoms, such as methyl, ethyl, propyl and butyl. The halogen of X is preferably chlorine or bromine.

Each of n and m is preferably 1 to 20.

Examples of the styrene include styrene and styrene derivatives such as α-methylstyrene, vinyltoluene and divinylbenzene, with styrene being preferred. The styrene derivatives may be used alone or in admixture of two or more.

In component (B), the content of styrene (or styrene derivative) is preferably 30 to 80% by weight, though not limited thereto.

In component (B), the content of the compound of formula (1) is 20 to 45% by weight. If this content is less than 20 wt %, agglomerates may form, and the emulsion may lose stability. If this content exceeds 45 wt %, coating strength may lower and the performance of the cationic emulsion may be adversely affected.

The structure obtained from polymerization of the compound of formula (1) is introduced into the shell preferably through the steps of polymerizing a styrene with a monomer having a tertiary amino group prior to the quaternization to the compound of formula (1), and thereafter quaternizing the polymer with a quaternizing agent.

Exemplary of the monomer having a tertiary amino group prior to the quaternization to the compound of formula (1) are (dialkyl)aminoalkyl (meth)acrylates such as dimethylaminomethyl (meth)acrylate, dimethylaminoethyl (meth)acrylate, dimethylaminopropyl (meth)acrylate, diethylaminomethyl (meth)acrylate, diethylaminomethyl (meth)acrylate, and diethylaminopropyl (meth)acrylate. They may be used alone or in admixture of two or more.

Examples of the quaternizing agent used herein include alkylene oxides of 2 to 4 carbon atoms such as propylene oxide and butylene oxide, and halogenated epoxy compounds such as epichlorohydrin and epibromohydrin. They may be used alone or in admixture of two or more. While the amount of the quaternizing agent added may be adjusted as appropriate to quaternization, it is preferably 5 to 200 parts by weight per 100 parts by weight of the monomer having a tertiary amino group.

The compound (2), alkyl (meth)acrylate having 1 to 22 carbon atoms in its ester moiety may be any alkyl (meth) acrylate having an ester moiety of 1 to 22 carbon atoms. Examples include (meth)acrylates having a straight or branched alkyl group of 1 to 22 carbon atoms, and cyclic alkyl (meth)acrylates, such as methyl (meth)acrylate, ethyl (meth)acrylate, propyl (meth)acrylate, n-butyl (meth)acrylate, isobutyl (meth)acrylate, tert-butyl (meth)acrylate, octyl (meth)acrylate, 2-ethylhexyl (meth)acrylate, lauryl (meth) acrylate, cetyl (meth)acrylate, stearyl (meth)acrylate, and cyclohexyl (meth)acrylate, with the ester moiety of 10 to 18 carbon atoms being preferred. They may be used alone or in admixture of two or more. As used herein, the term "alkyl (meth)acrylate" means alkyl acrylate and alkyl methacrylate.

Notably, the monomer mixture as component (B) contains 0 to 25% by weight, preferably 5 to 20% by weight of the compound (2), alkyl (meth)acrylate.

In addition to structural units of the styrene, compound of formula (1), and alkyl (meth)acrylate, described above, the polymer shell component used herein may comprise structural units of another copolymerizable monomer. Suitable monomers include nonionic monomers such as (meth)acrylamide and (meth)acrylonitrile, dialkyl diesters of maleic acid and fumaric acid, vinyl esters such as vinyl acetate and vinyl propionate, N-alkyl (meth)acrylamides, and methyl vinyl ether. Such a monomer may also be contained in the cationic core-shell type emulsion as long as the object of the invention is not impaired, and preferably in an amount of 5% by weight or less.

When the polymer shell component used herein is prepared, any prior art well-known polymerization methods are applicable, for example, solution polymerization using organic solvents, bulk polymerization in the absence of solvents, and emulsion polymerization in aqueous system with the aid of a low-molecular-weight or high-molecular-weight emulsifier.

A radical polymerisation catalyst may be used in the polymerisation reaction of component (B) while suitable examples include persulfates such as ammonium persulfate, potassium persulfate, and sodium persulfate, redox type polymerization catalysts based on such persulfate combined with reducing agent, and azo catalysts such as 2,2'-azobisisobutyronitrile and dimethyl 2,2'-azobis (2-methylpropionate). If necessary, a well-known chain transfer agent may be used in combination.

A catalytic amount is typically 0.1 to 2.0% by weight, preferably 0.2 to 1.0% by weight based on the monomers.

For the above polymerization, the temperature is typically 40 to 95° C., desirably 70 to 90° C. The polymerization time may be set appropriate and is preferably 5 to 15 hours.

The solid content is preferably 10 to 50% by weight, more preferably 15 to 35% by weight. A solid content of less than 10% by weight may result in a low reaction efficiency whereas a solid content in excess of 50% by weight may invite a substantial viscosity buildup.

From emulsion polymerization of polymer core component (A) and polymer shell component (B), there is obtained a cationic emulsion comprising a core-shell structure polymer according to the invention.

Specifically, a polymerisation reactor is purged with nitrogen, charged with deionized water, vinyl chloride as polymer core component (A), and polymer shell component (B), and with stirring, heated at a polymerization temperature, preferably 40 to 80° C. Further, a polymerization initiator to be described below is added for polymerization to take place. Thereafter, the residual monomers are removed at the time when the reactor internal pressure reaches 0 MPa. On subsequent cooling, a polymer is obtainable. It is determined by gel permeation chromatography (GPC) that the resulting emulsion contains a core-shell structure polymer of vinyl chloride resin and shell component rather than a copolymer of vinyl chloride with shell component.

The proportion of polymer core component (A) to polymer shell component (B) is between 25/75 and 75/25, preferably between 30/70 and 70/30 in weight ratio (A)/(B). If component (A) is less than 25%, the surface strength of a coating layer may be poor on use as a receiving layer of recording sheets. If component (A) exceeds 75%, much agglomerates may form.

Examples of the polymerisation initiator used in the emulsion polymerization include persulfate salts such as ammonium persulfate and potassium persulfate; azo compounds such as 2,2'-azobis(2-methylpropionamidine) dihydrochloride and azobisisobutyronitrile; peroxides such as cumene hydroperoxide, benzoyl peroxide, and hydrogen peroxide; and tartaric acid. Also useful are well-known redox initiators such as potassium persulfate and sodium hydrogensulfite. An amount of the polymerization initiator used is typically 0.1 to 2.0% by weight, preferably 0.2 to 1.0% by weight based on the monomers.

Also a nonionic or cationic emulsifier may be used insofar as the desired effects of the invention are not compromised. Exemplary nonionic emulsifiers include polyoxyethylene alkyl phenyl ethers, polyoxyethylene alkyl ethers, polyoxyethylene fatty acid esters, sorbitan fatty acid esters, polyoxyethylene sorbitan fatty acid esters, polyoxyalkylene alkyl ethers, polyoxyethylene derivatives, glycerol fatty acid esters, polyoxyethylene-hardened castor oil, polyoxyethylene alkyl amines, alkyl alkanol amides, or acetylene alcohol, acetylene glycol and ethylene oxide adduces thereof. Suitable cationic emulsifiers include dodecyltrimethylammonium acetate, trimethyltetradecylammonium chloride, hexadecyltrimethylammonium bromide, trimethyloctadecylammonium chloride, (dodecylmethylbenzyl)trimethylammonium chloride, benzyldodecyldimethylammonium chloride, methyldodecyldi(hydropolyoxyethylene)ammonium chloride, benzyldodecyldi(hydropolyoxyethylene)ammonium chloride, and N-[2-(diethylaminolethyl]oleamide hydrochloride.

Further, polymerization aids including chain transfer agents such as mercaptans, pH adjusting agents such as sodium carbonate, and defoamers may be used as long as the benefits of the invention are not compromised. The polymerization aid may be added all at once at the initial or continuously, or divided portions be added continuously or at intervals during polymerization.

The temperature at which emulsion polymerization is carried out is generally in the range of 40 to 80° C., desirably 50 to 70° C. The polymerisation time may be determined as appropriate, although it is preferably 10 to 15 hours. Polymerization is desirably carried out in an inert gas atmosphere such as nitrogen gas.

The solid content is preferably 10 to 50% by weight, more preferably 20 to 40% by weight. A solid content of less than 10% by weight may allow agglomerates to form. If the solid content exceeds 50% by weight, a large amount of agglomerates may form.

It is noted that at the end of polymerisation, a plasticizer, inorganic or organic filler, thickener and the like may be added insofar as the performance of the aqueous ink binder using the inventive emulsion is not compromised.

The resulting emulsion may have an average particle size of 10 to 1,000 nm, preferably 20 to 800 urn, and a viscosity of 5 to 1,800 mPa·s, preferably 10 to 500 mPa·s at 23° C.

While the cationic emulsion may be used in a variety of applications, it exhibits excellent color development, water resistance, humidity resistance, and high gloss when used in recording sheets, and excellent water resistance, humidify resistance, color visual perception, high gloss, and alcohol resistance when used in aqueous ink.

In one embodiment wherein the cationic emulsion is used in aqueous ink, an ink composition may be prepared by blending the vinyl chloride resin emulsion with a colorant, a water-soluble organic solvent, various additives, water and the like, and dispersing and mixing on a well-known dispersing machine, mixer, kneader or mill. The content of the vinyl chloride resin emulsion in the aqueous ink composition is preferably 2 to 30% by weight, more preferably 5 to 20% by weight, calculated as solids.

The colorant used herein may be dyes, pigments or the like, and is preferably present in an amount of 3 to 40% by weight, more preferably 5 to 30% by weight of the aqueous ink composition.

Examples of the water-soluble organic solvent include ethylene glycol monoether, diethylene glycol monoether, propylene glycol monoether, ethylene glycol dimethyl ether, diethylene glycol dimethyl ether, ethylene glycol, diethylene glycol, propylene glycol, glycerol, methanol, ethanol, isopropyl alcohol, methyl ethyl ketone, methyl cellosolve, ethyl cellosolve, acetone, ethyl acetate, and diacetone alcohol. The water-soluble organic solvent is preferably present in an amount of 0 to 60% by weight, more preferably 0 to 50% by weight of the aqueous ink composition. Water is preferably present in an amount of 5 to 95% by weight, more preferably 5 to 93% by weight, and even more preferably 10 to 90% by weight of the aqueous ink composition. Suitable additives include pigment dispersants, leveling agents, defoamers and the like, and these additives may be added in standard amounts commonly used in aqueous ink.

In the other embodiment wherein the cationic emulsion (or vinyl chloride resin emulsion) is used in recording sheets, it is advantageously used to form a receiving layer on recording sheets. A composition which is used to form the receiving layer may be prepared by blending the cationic emulsion (i.e., vinyl chloride resin emulsion) with a pigment, binder, various additives, water and the like, and dispersing and mixing on a well-known dispersing machine, mixer, kneader or mill. In the receiving layer-forming composition, the content of the cationic emulsion is preferably 0.1 to 10% by weight, more preferably 0.3 to 7% by weight, calculated as solids.

Examples of the pigment which can be compounded herein include amorphous synthetic silica, aluminum silicate, magnesium silicate, precipitated calcium carbonate, heavy calcium carbonate, calcium silicate, aluminum hydroxide, zeolite, fired clay, kaolin clay, talc, and white carbon. In the receiving layer-forming composition, the content of the pigment, is preferably 0 to 20% by weight, and if used, 5 to 20% by weight.

Exemplary of the binder used herein are water-soluble polymers including polyvinyl alcohol (inclusive of silanol-modified polyvinyl alcohol and carboxyl-modified polyvinyl alcohol), polyvinyl acetal, oxidized starch, etherified starch, carboxymethyl cellulose, hydroxyethyl cellulose, casein, gelatin, and acrylamide resins, which may be used alone or in admixture. The amount of the binder used is determined by taking into account the printability of recording medium, the strength of coating layer, surface gloss, and coating solution behavior. In general, the binder content is 0.1 to 20% by weight, preferably 0.3 to 10% by weight of the receiving layer-forming composition. A binder content of less than 0.1% by weight may lead to a lowering of coating layer strength. If the binder content exceeds 20% by weight, ink absorption may be low.

Water accounts for 5 to 39.8% by weight, preferably 10 to 90% by weight, and more preferably 30 to 80% by weight of the receiving layer-forming composition.

Further, suitable additives may be selected and added, for example, cationic polymers for helping fix the inkjet printing ink, dispersants, thickeners, preservatives, defoamers, coloring dyes, coloring pigments, fluorescent brighteners, water-resistant agents, antioxidants, UV absorbers, and the like.

The receiving layer-forming composition may be applied onto a substrate, typically commercially available paper, by a suitable coating means such as a brush, blade coater, air knife coater, curtain coater, Mayer bar coater, gravure coater, or roll coater and dried so as to provide a coating weight of 0.5 to 30 g/m$^2$, preferably 1 to 25 g/m$^2$, calculated as dry polymer solids.

EXAMPLES

Synthesis Examples, Examples, and Comparative Examples are given below by way of illustration and not by way of limitation. In Examples, all "parts" and "%" are by weight unless otherwise stated.

(1) Preparation of Polymer Shell Component

Synthesis Example 1

Preparation of Polymer Shell Component B-1

A 1-L four-neck flask equipped with a stirrer, thermometer, reflux condenser, and nitrogen gas inlet was charged with 141.8 parts (71.6%) of styrene, 35.5 parts (17.9%) of dimethylaminoethyl methacrylate, 1.8 parts of 2,2'-azobisisobutyronitrile, and 50.7 parts of isopropyl alcohol, held at 85° C. for 3 hours, further charged with 1.8 parts of 2,2'-azobisisobutyronitrile, and held at the temperature for 6 hours. Next, 15.5 parts of 90% acetic acid was added, and then 558 parts of water added. After dissolution in water, isopropyl alcohol was distilled off. Next, 27.7 parts of water was added, 20.9 parts (10.5%) of epichlorohydrin was added, and reaction was carried out at 80° C. for 2 hours. Water, 198 parts, was added, obtaining polymer shell component B-1 having a solid content of 20%.

Synthesis Example 2

Preparation of Polymer Shell Components B-2, B-3, B-4 and B-5

Polymer shell components B-2, B-3, B-4 and B-5 were prepared as in Synthesis Example 1 by charging a reactor with selected monomers in the proportion shown in Table 1.

TABLE 1

| Polymer shell component | Styrene (wt %) | Alkyl (meth)acrylate (wt %) | Cationic monomer (wt %) | Quarternizing agent (wt %) | Compound (1) (wt %) |
| --- | --- | --- | --- | --- | --- |
| B-1 | styrene (71.6) | — | DM (17.9) | EPi (10.5) | 28.4 |
| B-2 | Styrene (51.0) | LA (8.5) | DM (25.5) | EPi (15.0) | 40.5 |
| B-3 | Styrene (51.0) | BA (8.5) | DM (25.5) | EPi (15.0) | 40.5 |

TABLE 1-continued

| Polymer shell component | Styrene (wt %) | Alkyl (meth)acrylate (wt %) | Cationic monomer (wt %) | Quarternizing agent (wt %) | Compound (1) (wt %) |
|---|---|---|---|---|---|
| B-4 | Styrene (78.1) | | DM (13.8) | EPi (8.1) | 21.9 |
| B-5 | Styrene (48.6) | | DM (32.4) | EPi (19.0) | 51.4 |

LA: laryl acrylate
BA: butyl acrylate
DM: dimethylaminoethyl methacrylate
EPi: epichlorohydrin

Example 1

A polymerization vessel equipped with a stirrer, condenser, thermometer and nitrogen gas inlet was purged with nitrogen and charged with 9 parts of deionized water, 8.8 parts of vinyl chloride, and 81 parts of polymer shell component B-1, which were heated at 60° C. with stirring. Further a solution of 0.2 part of 2,2'-azobis(2-methylpropionamidine) dihydrochloride (initiator) in 1 part of deionized water was added whereupon polymerization reaction was run.

When the internal pressure of the polymerization vessel reached 0 MPa, the residual monomers were removed in vacuum to 1,000 ppm. The vessel was then cooled below 40° C., yielding a polymer emulsion having a solid content of 25%, pH 4.5 and a viscosity of 50 mPa·s at 23° C. as measured by a Brookfield viscometer. The results are shown in Table 2. Notably, the cationic emulsion (i.e., vinyl chloride resin emulsion) was determined by GPC to contain a core-shell structure polymer.

Methods for Evaluation of Fundamental Physical Properties

<Measurement of Solid Content>

A test was carried out by weighing about 1 g of a vinyl chloride resin emulsion in an aluminum foil dish, holding the dish in a dryer for heating at 105-110° C. for 1 hour, taking out of the dryer, allowing to cool down in a desiccator, and measuring the weight of the dry sample. A solid content was computed according to the equation:

$$R = \frac{D-A}{W-A} \times 100 \quad \text{[Mathematical Formula 1]}$$

wherein R is a solid content (%), W is the weight (g) of the aluminum dish containing the sample prior to drying, A is the weight (g) of the aluminum dish, and D is the weight (g) of the aluminum dish containing the dry sample. Note that the aluminum dish had a diameter of 70 mm and a height of 12 mm.

<pH Measurement>

A vinyl chloride resin emulsion was directly measured for pH by a pH meter according to the pH measurement method of JIS Z8802.

<Viscosity Measurement by Brookfield Viscometer>

A vinyl chloride resin emulsion was measured for viscosity by a viscometer (BM type. No. 1 rotor, 6 rpm) while maintaining the liquid temperature at 23±0.5° C.

<Average Particle Size>

It was measured by a light scattering particle size meter.
Sample Preparation
1. A sample was weighed in a disposable cup and diluted with deionized water at 25° C.
2. The diluted sample was filtered through a 300-mesh filter cloth.
    Liquid temperature: 25° C.
    Number of accumulations: 100
    Number of measurement: 1

Measurement

Once a proper concentration is confirmed, measurement is made under the above conditions. The result of measurement is confirmed satisfactory,

Examples 2 to 6

Cationic emulsions were prepared by carrying out polymerization as in Example 1 aside from using the formulation shown in Table 2.

Comparative Example 1

A polymerization vessel equipped with a stirrer, condenser, thermometer and nitrogen gas inlet was purged with nitrogen and charged with 22.5 parts of deionized water, 10.5 parts of vinyl chloride, and 65 parts (active ingredient 30%) of JONCRYL JDX-6500 (acrylate oligomer by BASF AG), which were heated at 60° C. with stirring. Further a solution of 0.1 part of ammonium persulfate (initiator) in 1 part, of deionized water was added whereupon polymerisation reaction was run.

When the internal pressure of the polymerization vessel reached 0 MPa, the residual monomers were removed in vacuum to 1,000 ppm. The vessel was then cooled below 40° C., yielding a polymer emulsion having a solid content of 30%, pH 7.5 and a viscosity of 10 mPa·s at 23° C. as measured by a Brookfield viscometer. The results are shown in Table 2.

Comparative Example 2

An emulsion was prepared by carrying out polymerization as in Comparative Example 1 in accordance with the formulation shown in Table 2 and using an emulsifier (Cation 2ABT by NOF Corp.).

Comparative Example 3

B-1 obtained in Synthesis Example 1 was used alone,

Comparative Examples 4 and 5

Cationic emulsions were prepared by carrying out polymerization as in Example 1 in accordance with the formulation shown in Table 2.

I. Evaluation of Performance as Gravure Printing Ink

To 100 parts of the emulsion of Example or Comparative Example, 1 part of a commercial pigment DISPERS RED SD-1011 (DIC Corp.) was added to give a sample of the following composition. The sample was set on a table-top printer GRAVO-PROOF CM (Nissio Gravure Co., Ltd.), where the printing roll was rotated one turn to print on a commercially available paper sheet, yielding Sample A.

| | |
|---|---|
| Vinyl chloride resin emulsion: | 25 pbw (solids) |
| Pigment: | 1 pbw |
| Water: | 75 pbw | a) Water Resistance

Sample A was set on a color fastness rubbing tester (Yasuda Seiki Seisakusho, Ltd.). Using water-wetted gauze, the rubbing test was carried out 25 cycles. The sample was rated according to the following criterion.
○: no color transfer to gauze
Δ: some color transfer
x: complete color transfer, printed area color faded b) Humidity Resistance Sample A was held at 50° C. and humidity 90% for one day, after which it was rated according to the following criterion.
○: no bleeding in printed area
Δ: some bleeding from printed area
x: full bleeding c) Gloss Sample A was measured for gloss by a gloss meter PG-1M (Nippon Denshoku Co., Ltd.), with a value at an angle of 60° being read out. Rating was made according to the following criterion,
○: gloss value of 90 or higher
Δ: gloss value from 70 to less than 90
x: gloss value of less than 70 d) Alcohol Resistance

Sample A was set on a color fastness rubbing tester (Yasuda Seiki Seisakusho, Ltd.). Using ethanol-wetted gauze, the rubbing test was carried out 25 cycles. The sample was rated according to the following criterion.
○: no color transfer to gauze
Δ: some, color transfer
x: complete color transfer, printed area color faded II. Evaluation of Performance as Inkjet Ink Preparation of Ink Sample B was prepared by combining 67 parts of the vinyl chloride resin emulsion of Example or Comparative Example with 20 parts of carbon black MA100 (Mitsubishi Paper Mills, Ltd.) and 13 parts of deionized water.

e) Tone

Sample B as prepared was coated on a commercially available paper sheet by a bar coater No. 4 and dried at 40° C. for 30 seconds. The coated paper and the sample as prepared were visually observed for cater appearance, and rated according to the following criterion.
○: equivalent, tone
Δ: lack of black density
x; tone changed f) Adhesion Sample B as prepared was coated on a flexible vinyl chloride film (Superfilm Nontack E, Okamoto Co., Ltd.) by a bar coater No. 4 and dried at 40° C. for 30 seconds. Adhesive tape (Cellotape® by Nichiban Co., Ltd.) was applied to the coated film and peeled therefrom, and rating was made according to the following criterion.
○: no peel
Δ: some peel
x: complete peel g) Dispersion (Aging Stability)

Sample B as prepared was allowed to stand at normal temperature for one week, after which sedimentation with time was visually observed, and rated according to the following criterion.
○: no sediment
Δ: sedimented, but restorable by agitation
x: sedimented, not restorable III. Evaluation of Performance as Receiving Layer of Recording Sheet Preparation of Receiving Layer By combining 100 parts of synthetic silica as pigment, 10 parts of polyvinyl alcohol (PVA117 by Kuraray Co., Ltd.) as binder, 10 parts (as solids) of the emulsion in Table 2, and 5 parts (as solids of cationic polymer (DK6852 by Seiko PMC Corp.), an ink receiving layer-forming coating solution of the following composition having a solid concentration of 21% was prepared. This ink receiving layer-forming coating solution was coated on a commercially available paper sheet to a coating weight of 8 g/m by a bar coater No. 7 and dried at 150° C. for 20 seconds, giving Sample C.

| | |
|---|---|
| Vinyl chloride resin emulsion | 1.7% (solids) |
| DK6852 | 0.8% (solids) |
| Synthetic silica | 16.8% |
| Polyvinyl alcohol | 1.7% |
| Water | 79.0% | h) Coating Solution Viscosity

The coating solution kept at a temperature of 25±0.5° C. was measured for viscosity by a BM viscometer.

i) Coating Layer Surface Strength

Using a color fastness rubbing tester (Tester Sangyo Co., Ltd.) with a weight of 500 g set, Samples C were rubbed on their surfaces over 100 cycles. The degree of surface flaw was rated by visual observation.
○: no surface flaws observed
Δ: some surface flaws observed
x: flaws observed over the entire surface j) Print Density Using a printer EPSON FX-101, four colors of black, yellow, cyan and magenta were solid-printed on sample C. The print density of each color was rated by visual observation according to the following criterion.
○: clearly printed without decolorization
Δ: partially decolorized
x: decolorized and color faded k) Water Resistance Using a printer EPSON EP-302, four colors of black, yellow, cyan and magenta were printed on sample C in a lattice pattern. The printed paper was immersed in deionized water at 25° C. for 30 seconds, after which bleeding of printed area was rated by visual observation according to the following criterion,
○: no bleeding in printed area
Δ: some bleeding from printed area
x: full bleeding It is evident from the results of Evaluation I in Table 2 that the inventive cationic emulsions of Examples 1 to 6 are improved in alcohol resistance as compared with the emulsion of Comparative Example 1 using a different polymer shell component from the inventive one. They are also improved in water resistance, humidity resistance, gloss and alcohol resistance as compared with the emulsion of Comparative Example 2 using a conventional cationic surfactant. They are also improved in water resistance and humidity resistance as compared with the cationic emulsion of Comparative Example 3 using only the inventive polymer shell component.

It is evident from the results of Evaluation II that, the inventive cationic emulsions of Examples 1 to 6 are improved in adhesion as compared with the emulsion of Comparative Example 1 using a different polymer shell component from the inventive one and the emulsion of Comparative Example 2 using a conventional cationic surfactant. They are also improved in tone, adhesion and dispersion as compared with the cationic emulsion of Comparative Example 3 using only the inventive polymer shell component.

It is evident from the results of Evaluation III that the inventive cationic emulsions of Examples 1 to 6 are effective in reducing the coating solution viscosity as compared with the emulsion of Comparative Example 1 using a different polymer shell component from the inventive one and the emulsion of Comparative Example 2 using a conventional cationic surfactant. They are also improved in coating layer surface strength as compared with the emulsion of Comparative Example 1. They are also improved in coating layer surface strength and other factors as compared with the cationic emulsion of Comparative Example 3 using only the inventive polymer shell component.

The invention claimed is:

1. A cationic emulsion comprising a core-shell structure polymer consisting of components (A) and (B) in a weight ratio (A)/(B) of 25/75 to 75/25,
    (A) a core component of the emulsion polymer obtained by polymerizing a monomer comprising a vinyl chloride monomer as a constituent,
    (B) a shell component of the emulsion polymer having a structure obtained by polymerizing a monomer mixture comprising a styrene and a compound of the general formula (1), or a styrene, a compound of formula (1), and a compound (2) which is a (meth)acrylate having 1 to 22 carbon atoms in its ester moiety as constituents wherein the compound of formula (1) is 20 to 45% by weight of the monomer mixture,
the general formula (1):

[Chemical Formula 1]

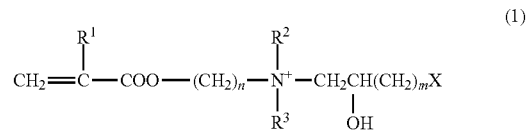

wherein $R^1$ is hydrogen or methyl, $R^2$ and $R^3$ are each independently alkyl, n and m are each independently an integer of at least 1, and X is halogen, methyl or hydrogen.

2. The cationic emulsion of claim 1 wherein in the polymer core component (A), the monomer consists of 80 to 100% by weight of vinyl chloride monomer and 0 to 20% by weight of a monomer copolymerizable therewith.

TABLE 2

| | Composition (pbw) | | Example | | | | | | Comparative Example | | | | |
|---|---|---|---|---|---|---|---|---|---|---|---|---|---|
| | | | 1 | 2 | 3 | 4 | 5 | 6 | 1 | 2 | 3 | 4 | 5 |
| A | Vinyl chloride | | 35 | 50 | 65 | 50 | 50 | 50 | 35 | 94 | | 50 | 80 |
| B | B-1 | | 65 | 50 | 35 | | | | | | 100 | | 20 |
| | B-2 | | | | | 50 | | | | | | | |
| | B-3 | | | | | | 50 | | | | | | |
| | B-4 | | | | | | | 50 | | | | | |
| | B-5 | | | | | | | | | | | 50 | |
| | JONCRYL JDX-6500 | | | | | | | | | 65 | | | |
| Emulsifier | Cation 2ABT | | | | | | | | | | 6 | | | |
| Fundamental physical properties | Solid content (%) | | 25 | 25 | 25 | 25 | 25 | 25 | 30 | 25 | 20 | 27 | 20 |
| | pH | | 4.5 | 4.5 | 4 | 4.5 | 5 | 4.5 | 7.5 | 4.5 | 4.5 | 5 | 3 |
| | Viscosity (mPa · s) | | 50 | 10 | 10 | 10 | 10 | 10 | 10 | 50 | 50 | 10 | 100 |
| | Average particle size (nm) | | 100 | 10 | 100 | 80 | 90 | 200 | 30 | 300 | 50 | 130 | 350 |
| Performance evaluation | I | a) Water resistance | ○ | ○ | ○ | ○ | ○ | ○ | ○ | x | Δ | ○ | ○ |
| | | b) Humidity resistance | ○ | ○ | ○ | ○ | ○ | ○ | ○ | Δ | Δ | Δ | ○ |
| | | c) Gloss | ○ | ○ | ○ | ○ | ○ | ○ | ○ | ○ | ○ | ○ | x |
| | | d) Alcohol resistance | ○ | ○ | ○ | ○ | ○ | ○ | Δ | x | ○ | ○ | ○ |
| | II | e) Tone | ○ | ○ | ○ | ○ | ○ | ○ | ○ | ○ | Δ | Δ | Δ |
| | | f) Adhesion | ○ | ○ | ○ | ○ | ○ | ○ | Δ | Δ | Δ | ○ | x |
| | | g) Dispersion (aging stability) | ○ | ○ | ○ | ○ | ○ | ○ | ○ | ○ | Δ | Δ | Δ |
| | III | h) Coating solution viscosity | 230 | 240 | 240 | 120 | 130 | 270 | 3,100 | 2,200 | 200 | 270 | 240 |
| | | i) Coating layer surface strength | ○ | ○ | ○ | ○ | ○ | ○ | x | ○ | x | Δ | Δ |
| | | j) Print density | ○ | ○ | ○ | ○ | ○ | ○ | ○ | ○ | ○ | Δ | Δ |
| | | k) Water resistance | ○ | ○ | ○ | ○ | ○ | ○ | Δ | Δ | ○ | ○ | Δ |

JONCRYL JDX-6500: BASF AG, styrene-acrylate oligomer
Cation 2ABT; NOF Corp., cationic surfactant of distearyldimethylammonium chloride type 3. The cationic emulsion of claim 1 or 2 wherein in the polymer shell component (B), the monomer mixture consists of 30 to 80% by weight of the styrene, 20 to 45% by weight of the compound of formula (1), 0 to 25% by weight of the compound (2), and 0 to 5% by weight of a monomer copolymerizable with the styrene and the compound of formula (1).

4. An aqueous ink composition comprising the cationic emulsion of claim 1.

5. The aqueous ink composition of claim 4 wherein the cationic emulsion is present in a content of 2 to 30% by weight calculated as solids, said ink composition further comprising 0 to 40% by weight of a colorant, 0 to 60% by weight of a water-soluble organic solvent, and 5 to 95% by weight of water.

6. A recording medium comprising a coating of the cationic emulsion of claim 1.

7. A recording medium comprising a coating of a composition comprising 0.1 to 10% by weight as solids of the cationic emulsion of claim 1, 0 to 20% by weight of a pigment, 0.1 to 20% by weight of a binder, and the balance of water or water and a water-soluble organic solvent.

8. The recording medium of claim 6 or 7 wherein the coating forms a receiving layer.

* * * * *